Patented Oct. 11, 1927.

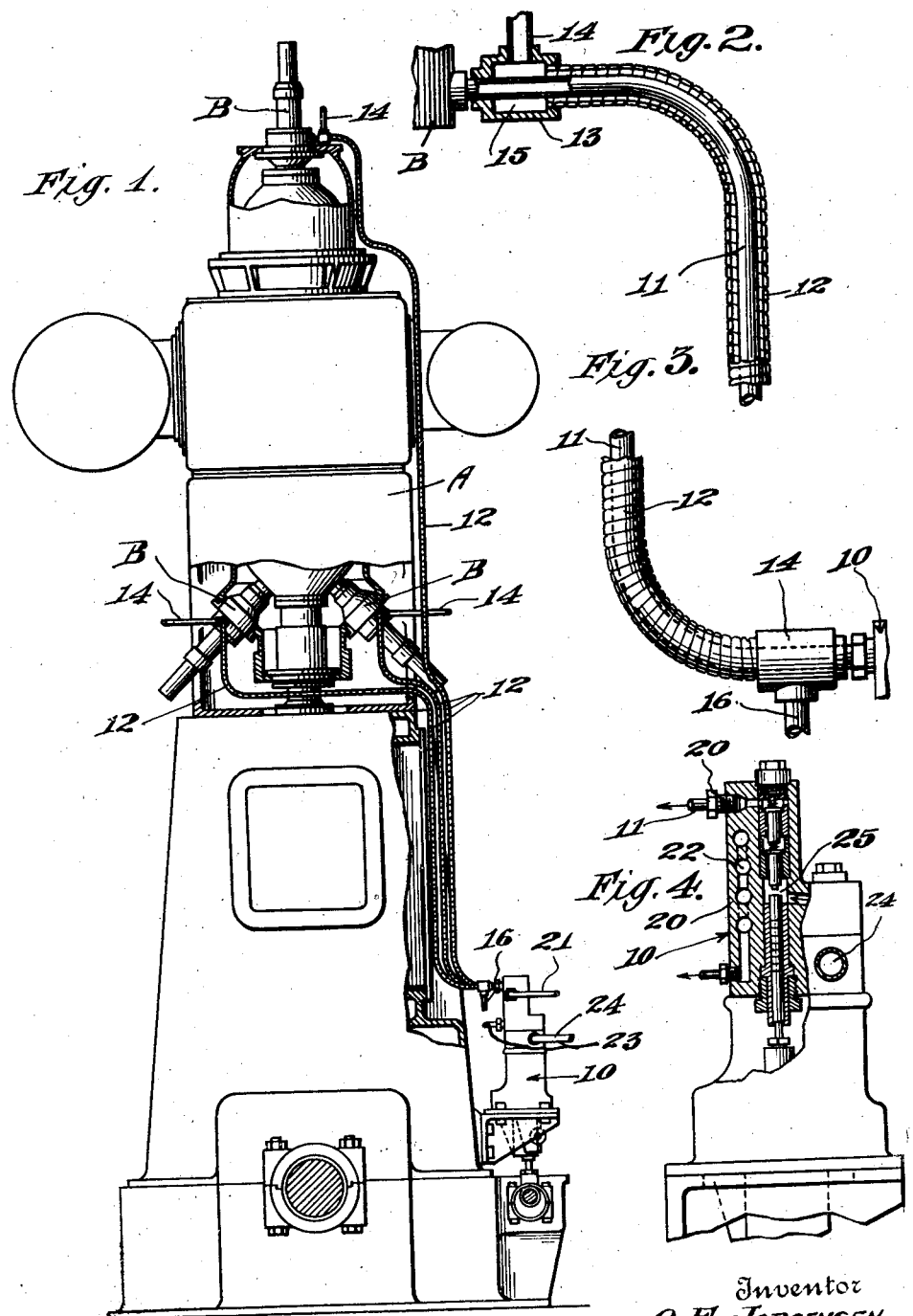

1,644,838

UNITED STATES PATENT OFFICE.

OLAV E. JORGENSEN, OF FOREST HILLS, NEW YORK, ASSIGNOR TO WORTHINGTON PUMP AND MACHINERY CORPORATION, OF NEW YORK, N. Y., A CORPORATION OF VIRGINIA.

STEAM-JACKETED OIL PUMP AND PIPE CONNECTION FOR INTERNAL-COMBUSTION ENGINES.

Application filed February 19, 1926. Serial No. 89,453.

This invention relates to internal combustion engines and more particularly to engines of the type utilizing oil as fuel. The invention is illustrated as applied to a double-acting internal combustion engine of the Diesel type but it may be advantageously applied to any type of internal combustion engine using oils of relatively high viscosity where it is desired to heat the oil to lower its viscosity for injection into the engine.

In the heating of the oil to maintain the proper viscosity to permit maximum efficiency in the operation of the engine it is desirable to prevent the formation of gases prior to the passage of the fuel oil through the fuel pump and in various types of engines the pipes delivering the fuel oil from the pump to the various spray valves are tortuous in shape rendering it difficult and expensive to jacket them with a rigid jacket.

An object of the present invention is to mount flexible-tubing jackets about the fuel oil supply pipes from the pump to the various spray valves and to connect such jackets with a suitable supply source of steam to permit the steam to circulate through the jackets for heating the oil after it leaves the fuel pump and prior to its entrance into the spray valves of the engine.

With these objects in view, the invention consists in various features of construction and combination of parts, which will be first described in connection with the accompanying drawings, showing a steam jacketed oil pump and pipe connections for internal combustion engines of the preferred form embodying the invention, and the features forming the invention will be specifically pointed out in the claims.

In the drawings—Figure 1 is a view partly in section of a double-acting internal combustion engine of the oil-burning type showing the invention applied.

Figure 2 is a fragmentary view partly in section of one of the fuel pipes and flexible jacketing showing the steam inlet.

Figure 3 is a fragmentary view of one of the jacketed fuel supply pipes showing the steam drain or outlet, and, Figure 4 is a detail view partly in section of the fuel pump illustrating the manner of jacketing the pump to permit heating of the oil during its passage therethrough.

Referring more particularly to the drawings, the engine A illustrated is of the double-acting oil-burning Diesel type, however, it is to be understood that the invention may be applied to various types of oil-burning engines.

The engine A has spray valves or fuel injection valves B connected thereto to which the fuel oil is fed by the fuel pump 10 through various fuel oil-conducting pipes 11. Owing to the location of the oil pump 10 and the various spray valves B, the pipes 11 assume tortuous shapes and for this reason jackets 12, which are formed of flexible tubing are utilized for jacketing the pipes 11. The flexible tubing may be of the well known flexible metallic type formed of spirally-wound connected strips of metal, or of any desired type of flexible, non-porous tubing which will confine the steam or other suitable heating fluid or gas within the jackets about the fuel-oil pipes 11. The flexibility of the tubing of which the jackets 12 are formed, permits the jackets to be readily or easily slipped over and about the various pipes 11 materially facilitating the assembling of the fuel system of the engine as well as decreasing its cost. The various flexible-tubing jackets 12 have collars 13 on their ends and steam inlet pipes 14 communicate with the collars 13 at the ends of the jackets adjacent to the spray valves so that steam entering the chambers 15 within the collars 13 may circulate downwardly through the jackets 12 providing the maximum heat to the pipes 11 adjacent to the spray valves B. The collars 14 at the ends of the jackets 12 adjacent to the pump 10 are provided with outlet or drainpipe 16 to permit the release of the steam from within the jackets and facilitate the circulation of the heating steam.

The casing or body 20 of the pump 10 is channelled, as shown at 22, in any suitable manner, and the uppermost end of the channel has communication with a steam inlet pipe 21 so that the steam entering the channel 22 will travel therethrough and out through the outlet pipe 23, permitting the heating of the oil as at passes through the pump structure 10. The oil is supplied to the pump structure 10 through a suitable oil supply 24 and is sucked or drawn into the pump chamber 25 being forced out of the pump at its upper end through the coupling 20 and various pipes 11.

The fuel oil is first heated in the pump structure 10 and then it is further heated in the pipes 11 by the circulation of the steam about the pipes 11 within the flexible-tubing jackets 12 and thus is brought to the proper viscosity to permit maximum efficiency of the engine without liability of the formation of gas due to the heating of the oil, either in the pump or before the oil enters the engine.

It will be understood that the invention is not to be limited to the specific construction or arrangement of parts shown but that these may be modified widely within the invention defined by the claims.

What is claimed is:

1. The combination with an internal combustion engine including a fuel pump, injection valves, fuel oil supply pipes between the pump and valves, of flexible jackets mounted about said supply pipes and having inlet openings adjacent to the injection valves and outlet openings adjacent to said pump to permit the circulation of a heating agent through the jackets, said pump including a casing provided with a channel to permit circulation of a heating agent through the pump casing.

2. The combination with an internal combustion engine including a fuel pump, injection valves, fuel oil supply pipes between the pump and valves, of flexible jackets mounted about the said supply pipes and extending throughout the length of the pipes, said jackets having inlet for heating fluid at the connection of the pipes with the spray valves whereby maximum heating of oil in the pipes will be had at the entrance of oil into the spray valves.

3. The combination with an internal combustion engine including injection valves and fuel oil supply pipes leading to said valves, of jackets about said pipes, and a fuel pump provided with a channel having communication with said jackets to permit circulation of a heating agent through the pump casing and jackets.

In testimony whereof I affix my signature.

OLAV E. JORGENSEN.